May 5, 1925.

T. B. DRESCHER 1,536,828

METHOD OF MAKING TORIC LENSES AND LENS BLANKS

Filed Nov. 29, 1921

INVENTOR
Theodore B. Drescher
BY
his ATTORNEY

Patented May 5, 1925.

1,536,828

UNITED STATES PATENT OFFICE.

THEODORE B. DRESCHER, OF ROCHESTER, NEW YORK, ASSIGNOR TO BAUSCH & LOMB OPTICAL COMPANY, OF ROCHESTER, NEW YORK, A CORPORATION OF NEW YORK.

METHOD OF MAKING TORIC LENSES AND LENS BLANKS.

Application filed November 29, 1921. Serial No. 518,667.

*To all whom it may concern:*

Be it known that I, THEODORE B. DRESCHER, a citizen of the United States, residing at Rochester, in the county of Monroe and State of New York, have invented certain new and useful Improvements in Methods of Making Toric Lenses and Lens Blanks; and I do hereby declare the following to be a full, clear, and exact description of the same, reference being had to the accompanying drawings, forming a part of this specification, and to the reference numerals marked thereon.

My present invention relates to the manufacture of ophthalmic lenses and has for its object to provide an improved method of making lenses of that class which when finished are provided with a concave surface having different curves in at least two meridians, such for instance as a toric lens and it further has for its object to provide a blank which may be cheaply produced and supplied to an optician and from which he can finish the required lens by the use of the ordinary tools at hand.

The difficulties in rough grinding and polishing concave toric lens surfaces and the accurate and expensive machines required for accomplishing this purpose are such that few manufacturers attempt to finish these surfaces in their own establishments. In order that these difficulties may be overcome and partially finished blanks may be cheaply and simply made by the lens manufacturer and supplied to the optician at a reasonable cost I have provided a method which enables this to be readily accomplished.

In carrying out my invention and as an example of the mode of procedure I first form as by molding, a blank of glass of the required refractive index, having a spherical concave surface—the curve of this surface corresponding to one of the meridians of the toric surface of the lens to be ultimately produced. And this concave spherical surface is then ground and polished in the usual way. The opposite or convex side of the blank is formed with a convex toric surface, one meridian of which, say the longitudinal, is formed on approximately the same curve as that of the spherical concave surface, while the curve of its other or transverse meridian is that of the longitudinal meridian of the toric curve that is to be formed on the concave side of the lens ultimately produced. I then provide a mold having a smooth convex surface which is toric and corresponds with the concave surface of the finished blank, the curve of the longitudinal meridian of the mold surface being the same as that of the transverse meridian of the blank just described while the transverse meridian of the toric curve on the mold is the same as that of the spherical surface of the blank. The blank having been placed on the mold with its concave surface in contact therewith is then heated in a suitable furnace to a sufficient degree to cause the glass to soften and fall into contact with the mold surface and cause the under or concave surface thereof to conform to that of the mold and this dropping operation will alter or modify the outer convex surface of the glass, so that the final blank produced will have its under or concave surface toric to correspond to that of the mold and its outer convex surface spherical or approximately so, on a curve corresponding to that of the longitudinal meridian of the concave toric surface. The surface of the mold employed is practically smooth and the concave toric surface of the blank having been previously ground and polished may readily be finished by a fine grinding if necessary to remove the scale and mold marks, if any, but usually a polishing operation is only required, without materially altering the shape of the surface, while the outer spherical surface is practically a flowed surface and may be readily finished by a very slight grinding and polishing operation with the usual spherical lap grinding and finishing tools in the ordinary way.

By this method the curves and surfaces of the blank used at the commencement of the operation are so related and coordinated that in the dropping operation there is the least amount of distortion or alteration in the glass and little or no opportunity for the formation of striæ in the glass which would interfere with its refracting properties.

As an example, I have shown sectional views of the blanks and molds illustrating the modifications of the blanks during the holding operation in which—

Similar reference numerals throughout the several views indicate the same parts.

Figure 1:
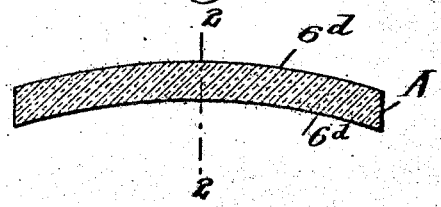
Figure 1 is a longitudinal section of the blank as it leaves the mold.
Figure 2:
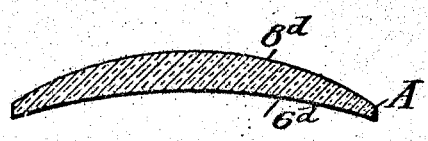
Figure 2 is a transverse sectional view thereof on the line 2—2 of Figure 1.
Figure 3:
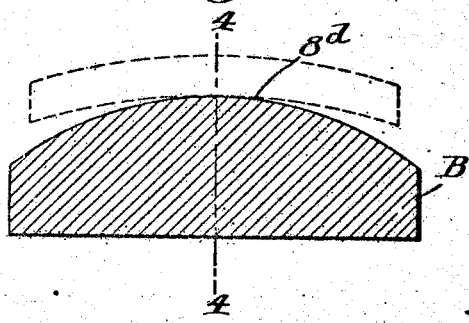
Figure 3 is a longitudinal section of the mold.
Figure 4:
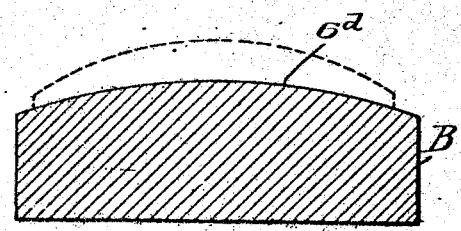
Figure 4 is a transverse section thereof on the line 4—4 of Figure 3.
Figure 5:
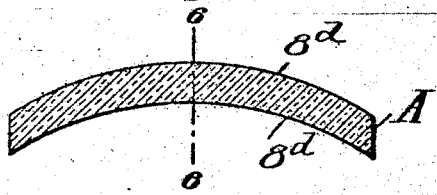
Figure 5 is a longitudinal section of the blank after leaving the mold.
Figure 6:
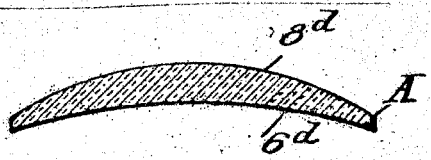
Figure 6 is a transverse section of the same on the line 6—6 of Figure 5.

In the example shown, the lens blank indicated by A, Figures 1 and 2, is molded or pressed so that it will have an outer toric surface, the longitudinal axis of which may, for purposes of illustration, be considered as 6 diopters, while the transverse axis of this toric surface is of 8 diopters, the respective curves referred to being indicated by the corresponding numerals in Figures 1 and 2. The under surface of this blank has, we will say, a spherical surface of 6 diopters indicated by the numeral 6 in each figure. The mold B, shown in section in Figure 3, has the longitudinal meridian of its upper surface formed on a curve of 8 diopters, indicated by 8ᵈ, and as shown in Figure 4, the transverse meridian of this mold surface is on a curve of 6 diopters indicated by 6ᵈ. The blank shown in Figures 1 and 2, having been placed upon the top of the mold B, as shown in dotted lines in Figures 3 and 4 is, with the mold, placed in a furnace and heated sufficiently to allow the lens blank to soften sufficiently to drop into contact with and conform to the surface of the mold. By this means the whole shape of the blank will be altered to that, as shown in Figures 5 and 6, the toric concave surface having its longitudinal meridian on an 8 diopter curve and its transverse meridian on a 6 diopter curve (see Figures 5 and 6) while the outer surface will be approximately spherical and on an 8 diopter spherical curve as shown in said figures.

By the method described, a considerable economy in the production of the lenses is secured and the former tedious and expensive concave toric rough grinding is obviated.

I claim as my invention:

1. A method of forming toric lenses comprising the following steps (1) preparing a glass blank provided with a concave ground and polished spherical surface on one side and a toric convex surface on the other, one of the meridians of said toric surface having approximately the same curve as that of the concave surface (2) placing the concave surface of the blank upon a mold having a convex toric surface, one meridian of which corresponds to the spherical surface of the blank, and (3) heating the blank sufficiently to cause it to drop into contact with the surface of the mold.

2. A method of forming toric lenses comprising the following steps (1) preparing a glass blank provided with a concave ground and polished spherical surface on one side and a toric surface on the other, one of the meridians of said toric surface having approximately the same curve as that of the concave surface (2) placing the concave surface of the blank upon a mold having a convex toric surface, the transverse meridian of which corresponds to the spherical surface of the blank, and (3) heating the blank sufficiently to cause it to drop into contact with the surface of the mold.

3. A method of forming toric lenses comprising the following steps (1) preparing a glass blank provided with a concave ground and polished spherical surface on one side and a toric convex surface on the other, one of the meridians of said toric surface having approximately the same curve as that of the concave surface, (2) placing the concave surface of the blank upon a mold having a convex toric surface, one meridian of which corresponds to the spherical surface of the blank (3) heating the blank sufficiently to cause it to drop into contact with the surface of the mold (4) grinding and polishing convex surface of the lens and (5) polishing the concave surface to remove scale and mold marks.

4. As an article of manufacture a toric lens blank consisting of a single piece of glass having a convex spherical surface on one side and on the opposite side a concave toric surface, one meridian only of said toric surface corresponding with the curve of the opposite spherical surface, the said spherical surface being a flowed surface and resulting from heating and softening a glass blank having a molded convex toric surface and a spherical concave ground and polished surface while said concave surface is in contact with the surface of a mold having the desired toric form.

THEODORE B. DRESCHER.